March 23, 1954
H. J. JOHNSON
2,672,757
LIQUID-LEVEL GAUGE
Filed June 26, 1951
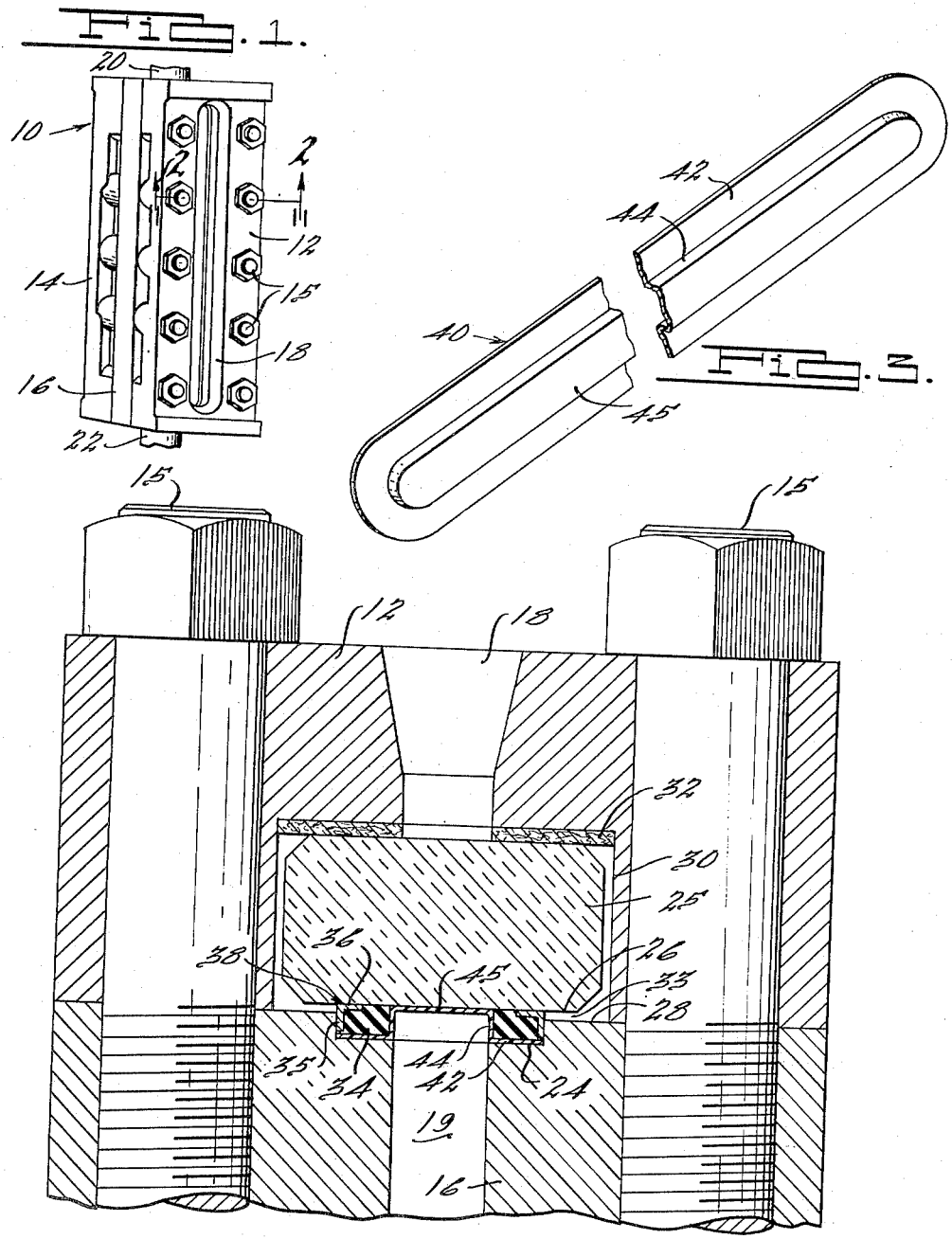
INVENTOR.
Horace James Johnson.
BY
Harness, Dickey & Pierce.
ATTORNEYS Patented Mar. 23, 1954

2,672,757

UNITED STATES PATENT OFFICE 2,672,757

LIQUID-LEVEL GAUGE

Horace James Johnson, Grosse Pointe, Mich., assignor, by mesne assignments, to Buffalo Elipse Corporation, a corporation of New York Application June 26, 1951, Serial No. 233,577

3 Claims. (Cl. 73—330)

The present invention relates to direct view liquid level gauges and constitutes an improvement upon the invention disclosed in the application of Howard D. Yoder, Serial No. 55,207, filed October 18, 1948.

The Yoder patent application discloses unique means for obtaining and maintaining an adequate seal between a transparent gauge glass and a gauge body, in a direct view liquid level gauge designed to withstand very high pressures (of the order, for example, of 15,000 pounds per square inch). The Yoder invention utilizes a trapped resilient gasket formed of a composition which would not be of sufficient mechanical strength to withstand the pressure, if installed in a conventional manner, but which is confined in such manner that it is effectively protected against mechanical destruction by such pressure, and is urged into sealing engagement with the sealed parts at all times, with an engagement pressure which is proportional to the pressure in the gauge, the arrangement being such that the resilient gasket can accommodate considerable variation in the positioning and dimensions of the parts, whether due to initial differences in manufacturing or assembly of the parts, or due to expansion and contraction under temperature changes. In the operation of such gauges of the Yoder-type, the life of the aforementioned resilient gasket material is under some conditions limited by the effect thereupon of the liquid in the gauge body. The present invention aims to provide a construction adapted to incorporate all of the advantages of the gauge disclosed in the aforementioned Yoder application but wherein the liquid in the gauge body is effectively prevented from causing deterioration of the gasketing or of the gauge glass, either by chemical or mechanical action, despite which the pressure within the gauge body is effective to pressurize the gasketing to achieve the highly effective sealing action inherent in the Yoder invention, as mentioned previously.

The foregoing and other objects which will become apparent upon consideration of the present disclosure in its entirety are achieved by the utilization of a resilient gasket which is trapped in a rabbet, formed in the gauge body and opening into the liquid chamber in a position to lie opposite a flat face of the gauge glass, these parts being constructed and arranged in accordance with the teaching of the Yoder disclosure, but the rabbet being somewhat larger in proportion to the cross section of the gasket and a unique shield, which is formed of relatively inert, flexible, transparent plastic material, being interposed between the gasket and the liquid chamber in the interior of the body, such shield also extending between the gasket and one face of the rabbet, the gasket being surrounded and confined by a rigid but floating frame member which prevents the gasket from being extruded through the space between the gauge glass and the body under the internal gauge pressure, and the flexible shield being designed to transmit the internal gauge pressure to the gasket so that the mechanical operation of the gasket occurs in all essential respects as if the shield were not present at all, while the liquid level is visible by looking directly through the shield.

In the drawing:

Figure 1 is a perspective view of a liquid level gauge constructed in accordance with the present invention;

Figure 2 is a horizontal cross-sectional view on a larger scale and partially broken away, taken substantially on the line 2—2 of Figure 1 and looking in the direction of the arrows; and Figure 3 is a perspective view of the shield, partially broken away.

Referring now to the drawings, reference character 10 designates generally a transparent liquid level gauge, the major structural components of which are of a type well-known in the art and which will require no detailed discussion, insofar as the general arrangement of the front and rear frame portions 12, 14 and interposed body 16 tightly secured together by bolts 15 is concerned. As is also common, the body 16 has a vertical slot-like liquid chamber 19 which is open front and rear, in alignment with vertical slot-like window openings as 18, in the frame members. Suitable nipple connections as 20, 22 are provided at the top and bottom of the gauge body for connecting the liquid chamber 19 therein to the vessel (not shown), the liquid level wherein is to be indicated.

It will be appreciated that this invention is also applicable to gauges of the closed-back type, and that description of my invention as applied to a single window will suffice, in any event, to enable those skilled in the art to incorporate the invention readily in gauges differing in the indicated particulars and in other respects.

In accordance with the teaching of the above mentioned Yoder patent application, a rabbet 24 is formed in the face of the body 16 surrounding the slot-like liquid chamber 19. The flat face 26 of the gauge window glass 25 is wider and longer than the rabbeted portion of the body 16 and the glass is held in position across, but somewhat spaced from, the rabbeted face 28 of the body, being held against outward movement by the frame 12. The frame 12 is suitably recessed as indicated at 30 to accommodate the gauge glass and a cushioning gasket 32 which is interposed between the opposite or outer face of the gauge glass and the frame. The cushioning gasket is appropriately slotted in registry with the window opening. The recess 30 is somewhat deeper than the combined depth of the gauge glass 25 and cushioning gasket 32. By virtue of the slight excess depth of the recess 30, a space 33 is left between the respective opposed faces 26, 28, of the gauge glass and body.

A deformable gasket 34 of synthetic rubber or the like is contained in the rabbet 24. Surrounding gasket 34 and accurately fitted in the rabbet 24 in such manner as to be slidable inwardly and outwardly of the rabbet, in a direction perpendicular to the gauge glass, is a floating frame 38 of right-angular cross-section, rigidly formed of metal and serving to confine the gasket 34 against unwanted expansion. One flange 35 of the floating frame 38 lies against the outer walls of the rabbet, and a second flange 36 extends inwardly between a portion of the gasketing material and the gauge glass, and lies flat against the inner face 26 of the gauge glass.

A transparent shield 40 is provided, the general shape of which is best indicated in Figure 3. Shield 40 isolates the chamber space 19 from the gasket 34 and from gauge glass 25, and is so contoured as to lie flat against the inner surfaces of the gasket and gauge glass which would otherwise be exposed to the interior of the chamber space. The pressure within the chamber is accordingly transmitted to the gasket and gauge glass through the shield in compression. As shown in Figure 2, the shield is of double bent cross-section, having a flat peripheral flange portion 42 projecting into and lying in the flat bottom of the rabbet under the gasket 34. A vertically projecting flange portion 44 of the shield bounds the inner wall of the gasket 34 to define in effect a continuation of the wall of chamber 19. The vertical height of flange 44, in a direction perpendicular to the plane of the gauge glass, substantially corresponds to the normal or intended mean distance between the bottom of the rabbet 24 and the opposing face 26 of the gauge glass. An integral transverse web portion 45 joins the vertical flange portions 44, to impart to the shielding member the contour of an elongated hat and complete the isolation of the material in the chamber. Such material can thus only contact the walls of chamber 19 and the shield, and is effectively prevented from contacting either the gasket or glass. The shield is preferably formed of a transparent material which is substantially inert with respect to and unaffected by the contents of the gauge chamber, and which is sufficiently flexible so that pressure in the chamber is transmitted through the shield to the resilient gasket 34. The resultant pressurizing of the gasket 34 causes the latter to tightly seal against the face 26 of the gauge glass and urges the flange 42 tightly against the bottom of the rabbet 24, effectively sealing these portions.

The confining floating frame 38 prevents any extrusion of the gasket 34 through the gap 33 and by its ability to move perpendicularly to the face 28, the floating frame compensates for differences in the space defined by the gap 33. Variances in the gap 33 may be due, for example, to temperature changes or to variances in dimensioning of the parts.

I have found that for most purposes, a plastic such as monochlortrifluoroethylene is a suitable material for the shielding member 40, since such material is highly inert, transparent, flexible, and yet has great structural strength, so that it is neither chemically attacked nor easily eroded by most substances. Such material is sold by the M. W. Kellogg Company of Jersey City, New Jersey under the trade-name "Kel-F," by the Bakelite Division of Union Carbide and Carbon Corporation under the trade-name "CF-3," and by the Carbide and Carbon Chemical Division of Union Carbide and Carbon Corporation under the trade-name "Fluorothene."

I have utilized gauges constructed in accordance with the present disclosure to indicate the liquid level in high-pressure vessels containing hydrocarbon materials which would rapidly deteriorate the synthetic rubber gasket 34, and have operated the same for extended periods at pressures of the order of 15,000 pounds per square inch with no deterioration of the seal, and no leakage or other difficulty. The gauge retains both its transparency and its efficiency over substantial periods of time.

It will be appreciated that other materials might be employed for the shield, the primary consideration being the selection of a material which is not harmfully affected by the material in the gauge, yet is highly transparent, flexible and of sufficient mechanical strength to withstand the pressures encountered in service. It will also be understood that the invention is susceptible of further variation, modification and change without departing from the spirit and scope of the subjoined claims.

I claim:

1. A direct view liquid level gauge including a body having an internal chamber and a window opening communicating with the chamber, a window element adapted to substantially cover the window opening and to extend in a position relatively close to but spaced from a portion of the body surrounding the window opening, means for holding said window element against movement away from the window opening, a resilient gasket interposed between the window element and said portion of the body surrounding the window opening, at least a portion of said gasket being in pressure-conductive communication with the chamber in the body and distortable by pressure in the chamber to react against the window and against said portions of the body surrounding the window opening when subjected to such pressure, a flexible transparent shield interposed between said gasket and the chamber in the body, an integral portion of said shield extending between said gasket and said portion of the body surrounding the window opening and another integral portion of the shield blocking communication between the chamber and the line of juncture of the gasket with the windows.

2. A direct view liquid level gauge including a body having an internal chamber and a window opening communicating with the chamber, a window element adapted to substantially cover the window opening and to extend in a position relatively close to but spaced from a portion of the body surrounding the window opening, means for holding said window element against movement away from the window opening, a resilient gasket interposed between the window element and said portion of the body surrounding the window opening, at least a portion of said gasket being in pressure-conductive communication with the chamber in the body and distortable by pressure in the chamber to react against the window and against said portions of the body surrounding the window opening when subjected to such pressure, a flexible transparent shield interposed between said gasket and the chamber in the body, an integral portion of said shield extending between said gasket and said portion of the body surrounding the window opening and another integral portion of the shield interposed between the chamber and the window.

3. A direct view liquid level gauge including a body having an internal chamber and a window opening communicating with the chamber, a window element adapted to substantially cover the window opening and to extend in a position relatively close to but spaced from a portion of the body surrounding the window opening, means for holding said window element against movement away from the window opening, a resilient gasket interposed between the window element and said portion of the body surrounding the window opening, a resilient shield formed of flexible transparent material and of stepped cross section having a marginal flange portion adapted to project between the gasket and the body, an offset central portion adapted to lie against the inner face of the window element, and a connecting portion integral with both said last two previously mentioned portions adapted to bear against the portion of the gasket which extends between the body and window element, whereby said shield isolates the chamber from both the window element and the gasket, and whereby pressure in the chamber may be transmitted through said flexible shield to the gasket.

HORACE JAMES JOHNSON.

References Cited in the file of this patent

UNITED STATES PATENTS

| Number | Name | Date |
|---|---|---|
| 1,195,911 | Comp | Aug. 22, 1916 |
| 2,201,542 | Kinderman | May 21, 1940 |
| 2,579,719 | Yoder | Dec. 25, 1951 |

FOREIGN PATENTS

| Number | Country | Date |
|---|---|---|
| 257,414 | Germany | Jan. 24, 1912 |
| 570,387 | Great Britain | July 4, 1945 |